United States Patent
Niggemeier et al.

(10) Patent No.: US 8,806,253 B2
(45) Date of Patent: *Aug. 12, 2014

(54) POWER DOWN OF EXECUTION UNITS FOR ISSUED INSTRUCTION ACCUMULATION WHEN ISSUE RATE OF INSTRUCTIONS FALLS BELOW THRESHOLD AND AT LEAST TWO ARE INDEPENDENT

(75) Inventors: Tim Niggemeier, Laatzen (DE); Harry Barowski, Boeblingen (DE); Maarten Boersma, Holzgerlingen (NL); Gunnar Spiess, Balingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,809

(22) Filed: Aug. 8, 2012

(65) Prior Publication Data

US 2012/0303991 A1 Nov. 29, 2012

Related U.S. Application Data

(62) Division of application No. 12/397,830, filed on Mar. 4, 2009, now Pat. No. 8,245,065.

(51) Int. Cl.
*G06F 1/32* (2006.01)
*G06F 9/38* (2006.01)

(52) U.S. Cl.
CPC .................................... *G06F 1/3287* (2013.01)
USPC ............................ 713/324; 712/214; 713/322

(58) Field of Classification Search
None
See application file for complete search history.

(56) References Cited

U.S. PATENT DOCUMENTS

| | | | |
|---|---|---|---|
| 5,452,401 A * | 9/1995 | Lin | 713/322 |
| 6,144,982 A | 11/2000 | Panwar | |
| 6,275,948 B1 | 8/2001 | Bays et al. | |
| 6,895,520 B1 * | 5/2005 | Altmejd et al. | 713/324 |
| 7,673,160 B2 | 3/2010 | Peterson | |
| 7,840,823 B2 | 11/2010 | Kuwahara | |
| 7,992,017 B2 | 8/2011 | Safford et al. | |

OTHER PUBLICATIONS

Homayoun et al., "Reducing the Instruction Queue Leakage Power in Superscalar Procesors", IEEE CCECE/CCGEI, Ottawa, May 2006, pp. 1685-1689.

Hu, et al., "Microarchitectural Techniques for Power Gating of Execution Units", ISLPED'04, Aug. 9-11, 2004, Newport Beach, California, pp. 32-37.

(Continued)

*Primary Examiner* — Kenneth Kim
(74) *Attorney, Agent, or Firm* — Scully, Scott, Murphy & Presser, P.C.

(57) ABSTRACT

A method of power gating a microprocessor having an instruction scheduling unit for receiving issued instructions from an instruction decoder; an execution unit receiving and sending signals from and to the instruction scheduling unit; and a state machine. The method comprises: obtaining a number of instructions per cycle being issued to the instruction scheduling unit; determining, if the number of instruction per cycle being issued to the instruction scheduling unit is less than a threshold level, and then determining if at least two of the instructions being issued to the instruction scheduling unit are independent of each other only when the instructions per cycle is less than the threshold level; determining when at least two of the instructions being issued to the instruction scheduling unit are independent of each other; and power gating the microprocessor to gate off power to idle macros with a signal from the state machine.

11 Claims, 2 Drawing Sheets

(56) References Cited

OTHER PUBLICATIONS 8. van Lunteren, et al., "XML Accelerator Engine", J. Bostian, B. Carey, and C. Larsson, First International Workshop on High Performance XML Processing, in conjunction with the 13th International World Wide Web Conference (WWW2004), New York, NY, USA, May 2004, pp. 1-6.

* cited by examiner

POWER DOWN OF EXECUTION UNITS FOR ISSUED INSTRUCTION ACCUMULATION WHEN ISSUE RATE OF INSTRUCTIONS FALLS BELOW THRESHOLD AND AT LEAST TWO ARE INDEPENDENT

RELATED APPLICATIONS

This application is a divisional of U.S. application Ser. No. 12/397,830, filed Mar. 4, 2009.

BACKGROUND

1. Field

This invention relates to a microprocessor and, more particularly, to power gating execution units in a microprocessor.

2. Description of the Related Art

Process technology trends in semiconductor manufacturing suggest that power dissipation is a major design challenge in high performance VLSI chips. For all circuit applications it is highly desirable to reduce and limit power dissipation in deep sub-micron semiconductor designs. In high performance server applications, for example, power dissipation leads to expensive packaging and cooling solutions. On the other end of the performance spectrum, the wide spread use of battery operated devices, such a lap top computers, mobile phones and personal digital assistants (PDA's), without significant advances in battery technology, creates an urgent need to address power dissipation in integrated circuits.

Consistent with constant electric field scaling, semiconductor power supply voltages have been substantially reduced with each technology generation. The reduction in power supply voltage is necessary to manage active power dissipation as well as to maintain circuit reliability. With power supply voltage scaling, the device threshold voltage (Vt) must be reduced to maintain or improve performance. Depending on the process technology, this reduction in Vt leads to an exponential increase in sub-threshold leakage current, which, in some cases, may represent the primary source of power dissipation in the chip. Indeed, for current microprocessor designs, power dissipation due to sub-threshold leakage current constitutes 40-50 percent of total chip power. Consequently, a clear need exists to develop novel techniques for controlling and reducing leakage power, especially since leakage power is expected to grow with each new generation of process technology.

Techniques for the control and reduction of leakage current may be divided into two approaches: static and dynamic. The static approach to low leakage circuit design is directed to circuit geometries rather than to a functional aspect of the circuit. Such circuit design techniques are intended to reduce leakage current regardless of the mode of chip operation. Dynamic techniques, on the other hand, allow the dynamic control of certain functional blocks of the design during functional operation. In this regard, dynamic techniques involve setting certain functional blocks of the chip into low or no leakage mode when they are in "idle" or "sleep" state. Power gating is one common dynamic leakage control mechanism where circuit blocks that are not in use are temporarily turned off to reduce the overall leakage power of the chip. When circuit blocks are required for operation once again they are activated to "active mode". These two modes are switched at the appropriate time and in the suitable manner to maximize power performance while minimizing impact to performance.

Modern high performance and power efficient microprocessors use various techniques to clock functional units/macros when in their active state and clock gate logic when in their idle state. These techniques can accommodate pipeline stages based on instruction types and can be data dependent. Thus, active switching power is both reduced and adapted to the workload.

As the scaling of CMOS transistors reaches atomic dimensions, physical effects such as tunneling or sub-threshold leakage currents in CMOS transistors contribute substantially to power dissipation and loss. This loss of power can be reduced substantially by powering off the idle logic macros, i.e., power is gated off to switch off leakage currents between Vdd (supply voltage) and Gnd (ground) level.

Current implementations of power gating use simple state machines controlled by various events such as (branch) misspredictions or (cache) data misses upon loads or idle counters, which are incremented as long as an instruction is not issued to an execution unit. If the counter reaches a threshold value, the execution unit will be power gated. If instructions are issued to the execution unit, the unit will be re-powered - mostly going through a re-powering sequence- and will then change back to its operational mode once the power is stable and the unit is initialized.

While the process noted above works well for workloads which have phases of high unit usage and phases of long idle periods, power gating of the execution unit will occur during the idle phases which will substantially reduce leakage currents. However, with workloads which periodically show short and regular idle phases of just a few cycles to the execution unit, the idle threshold may not be reached. In addition, when running a mixture of application with different resource requirements simultaneously, multi-threading may cause a periodical issue sequence to various execution units which show short idle phases which are shorter than the threshold value. As a consequence, power gating is never applied and, therefore, energy is not saved because the functional unit stays powered, even during all idle cycles.

SUMMARY

To overcome the shortcomings noted above, a power gate control logic represented by a state machine located in an execution unit is configured to generate a signal which starts operation of the power gate mode. After a certain time interval operation of the power gate mode is terminated and instructions are allowed to issue again. The timing of the power gate active phase is determined by a cycle count which is taken from measurements on how long it takes to execute as many instructions as can be stored in an instruction queue. The power gate active phase will be active for at least as long as it takes for the number of cycles to occur which are needed to gain overall power reduction. The state machine can balance the breakeven minimum power gate "on" mode to obtain energy reduction with respect to the buffering capabilities of the instruction queue in the instruction scheduler without affecting the overall Instructions Per Cycle (IPC) of the microprocessor.

In an embodiment of the invention there is disclosed a method of power gating a microprocessor having
 an instruction scheduling unit for receiving issued instructions from an instruction decode unit;
 an execution unit coupled to receive and send signals from and to said instruction scheduling unit; and
 a state machine located within said execution unit, said method comprising the steps of:
 obtaining a number of instructions per cycle being issued to the instruction scheduling unit;

determining, subsequent to obtaining the number of instructions per cycle, if the number of instruction per cycle being issued to the instruction scheduling unit is less than a threshold level, and then determining if at least two of the instructions being issued to the instruction scheduling unit are independent of each other only when the instructions per cycle is less than the threshold level;

determining when at least two of the instructions being issued to the instruction scheduling unit are independent of each other; and power gating the microprocessor to gate off power to idle macros with a signal from said state machine when said instructions are independent of each other.

In another embodiment of the invention there is disclosed a microprocessor having power gate control logic comprising:

an instruction scheduling unit coupled in handshaking relationship with an execution unit:

said execution unit comprising a state machine, instructions per cycle logic and functional macros;

said instruction scheduling unit comprising an instruction queue, and processing issue logic;

wherein instructions are selectively sent between said instruction queue in said instruction scheduling unit and the functional macros and state machine in the execution unit to control the operation of the power gate mode to control leakage currents in CMOS transistors.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the conception and specific embodiment as a base for designing or modifying the structures for carrying out the same purposes of the present invention and that such other featured do not depart from the spirit and scope of the invention in its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

DETAILED DESCRIPTION

Figure 1:
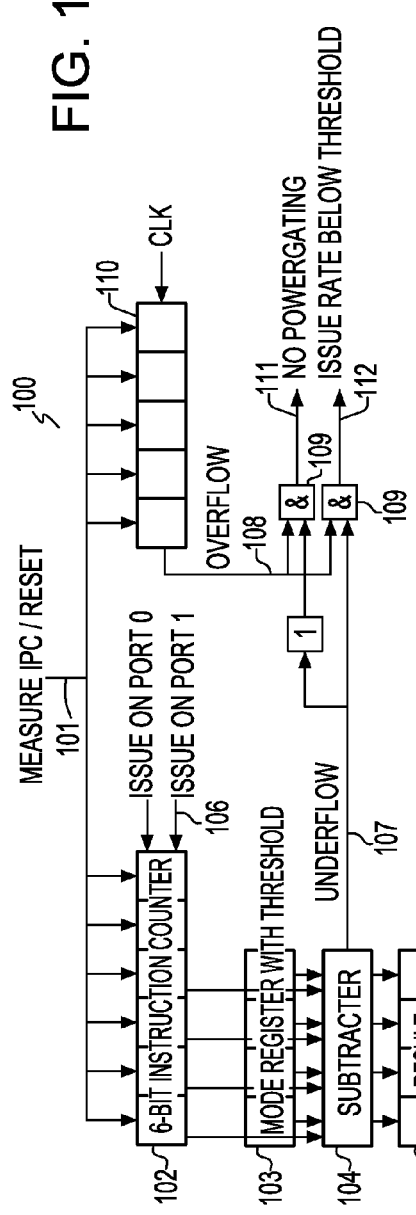
FIG. 1 is a diagram of structure for obtaining Instructions Per Cycle (IPC)

In out-of-order processors, assembled instructions are fetched, decoded and dispatched in an instruction queue. An instruction scheduler then resolves dependencies, applies register renaming to solve WAW (Write And Wait) and WAR (Write And Read) conflicts and selects instructions with valid operands for transmission to appropriate free execution units. As the instructions reside in an instruction buffer, the instruction execution may be temporarily disordered since the completion of an instruction via a reorder buffer will allow the execution units to complete the instructions in the original program order even if the instruction execution is done out-of-order.

Instruction issue and finish is controlled by means of hand shaking between the instruction scheduler and the execution unit. If power gating is applied to an execution unit, additional hand shaking is necessary so that an instruction issue to a power gated unit is avoided to prevent a possible loss of the instruction and to a wrong register state. Thus, instruction issue is only possible if the associated execution unit signals that it is powered. Otherwise the instruction scheduler will signal an instruction coming signal that starts re-powering the execution unit. At the completion of re-powering, the execution unit allows instructions to issue by using the available signal.

The hand shaking mechanism now allows additional scenarios where the execution unit may introduce power gated phases if the issue patterns indicate that the instruction issue can be compacted into bunches of instructions separated by longer idle times by relying on buffering capacities available from the instruction queues in the instruction scheduler.

Here there are different possibilities which have a common principle. The execution unit will indicate that it is not available once a state machine defines that power gating can be applied because the execution unit usage shows an instruction per cycle (IPC) which is less than one. Thus, the instruction scheduler will not issue instructions to the execution unit, but will indicate a wake-up signal if appropriate instructions are available for issue. The execution unit itself now determines when to raise the available signal again after a certain period of power gated cycles to allow instruction issue again. The state machine inside the execution unit may balance the break even minimum power gate cycles to obtain energy reduction with respect to the buffering capabilities of the instruction queue in the instruction scheduler without affecting the overall IPC of the microprocessor. The power gate cycles are adjusted to avoid being too long or too short. If the power gate cycles are too long the instructions queues can fill up and the processor might stall thus impacting overall performance. If the power gate phase is too short the re-powering of the unit will use more energy than was saved due to leakage currents cutoff.

Implementation-Details

The execution unit controls when to enter power gate mode by means of a state machine. Instead of just counting idle counters, and where the idle counter exceeds a certain threshold value which causes the unavailable signal to be raised and sent to the instruction scheduler, common patterns of idle/active cycles are taken into account.

If the IPC count is constantly below a certain value, e.g., lower than a predetermined threshold value, e.g., one-half, in an embodiment the execution unit can change into another sequence by counting the active phases, i.e., phases where instruction issue is detected without idle cycles. If the number of active cycles reaches a threshold, which is in the order of half the entries of the instruction queue inside the instruction scheduler, the unavailable signal will be raised to indicate that the execution unit will change into the power gate mode. Then, if no instruction is received in the next cycle(s), the execution unit will go into the power gate mode for at least as many cycles which represent the idle cycles counted in the temporal sequence during which the active cycles have been counted to reach the threshold mentioned above. After this interval of cycles, the unavailable signal is dropped and the instruction scheduler can start issuing the corresponding instructions which have been collected in the instruction queue during the power gate mode. If data dependencies will not prevent longer latencies, the instructions are issued cycle-by-cycle with high IPC, before the execution unit itself again signals to enter the power gate mode.

Thus, the instruction sequence is compacted into phases with high IPC with power gate phases between. Overall, the power-on time of the execution unit is reduced by relying on the buffer capabilities of the instruction queues for preventing pipeline stalls and significant performance degradation.

Referring to FIG. 1, there is shown a diagram 100 of computer device or like processing structure for obtaining Instructions Per Cycle (IPC). A new measure of the IPC is initiated by triggering control signal 101 which resets instruction counter 102 and clock cycle counter 110. Instruction counter 102 is increased by any instruction that is received on either port "0" or port "1". The output of counter 102 is fed to subtracter 104. A given threshold value in the programmable register 103 is fed to subtracter 104 where it is subtracted by the counter value in subtracter 104, and the result is fed to counter 105. If the resultant of the two signals is an under flow, it is fed on line 107 to AND gates 109, one of which receives the signal through an inverter.

Each time 5-bit cycle counter 110 reaches a pre-determined value, e.g., the value of thirty two (32), the overflow signal is fed to AND gates 109. The signal 108 from the counter 110 is used to enable the gates to assert either a "no power gating" signal 111 or an "issue rate below threshold" signal 112.

Figure 2:
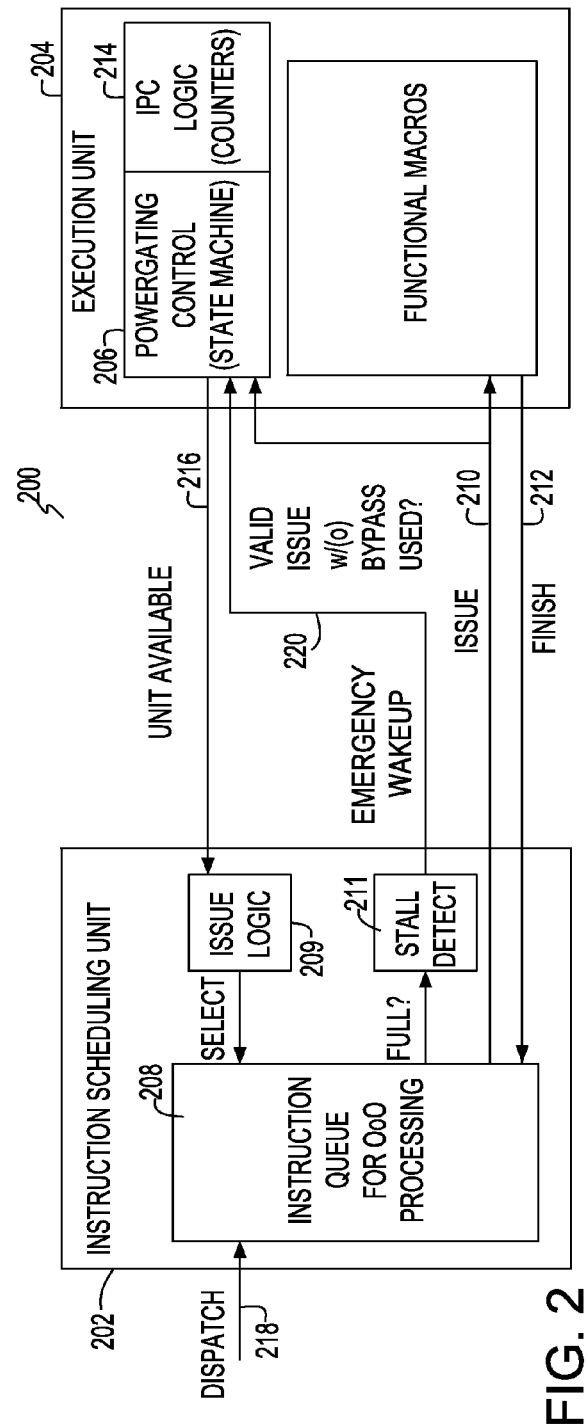
FIG. 2 is a system block diagram showing implementation of the invention.

FIG. 2 is a block diagram showing an implementation 200 of the invention where Instruction Scheduling Unit (ISU) 202 is coupled to execution unit 204 which has a power gate control logic, also referred to herein as a State Machine 206. Instructions stored in the instruction queue 208 are transmitted on conductive path 210 to execution unit 204 if the source data in the execution unit is available and the execution is ready for execution. Upon completion of the instruction, a finish signal 212 is sent back to the instruction scheduler thus allowing removal of the instruction from the instruction queue and freeing up of one entry for another instruction.

The power gate logic is dynamically adjusted to the usage of the execution unit by measuring the throughput IPC (instructions per cycle) via counter 214, shown as 100 in FIG. 1. If the power gate control logic decides to enter the power gate state, the functional macros are power gated. During this period the unit available signal 216 is dropped and signals the ISU that the execution unit will not accept any instructions for execution.

While the execution unit is available (signal on 216), the issue logic 209 selects every cycle up to two instructions (on a dual port execution unit) in the instruction queue for issuing to the execution unit, considering the availability of source data (Read and Write (RAW) conflict avoidance). Referring to the stall detect function, 211, if the instruction queue, 208, is determined as almost full and the execution unit has raised the unavailable signal, 216, the emergency wakeup signal 220 is raised to immediately power on the execution unit. This can happen if the dispatch rate on 218 increases. An overflow of the instruction queue, 208, will result in a stall condition of signals on 218 from an instruction fetch from a memory, not shown, to the instruction scheduling unit 202.

Since the ISU incorporates out-of-order execution, it uses an instruction queue 208 which is filled via instruction dispatch 218 from an instruction decode unit, not shown. If the instruction queue is filled up and a pipeline stall will emerge, an emergency wake-up signal 220 can be introduced which allows a quick wake-up of the execution unit enabling instruction to re-issue as soon as the unit is re-powered and the unit available signal is activated. To avoid the power gate logic from entering the power gate mode because the usage of the execution unit is low due to dependent instructions, a bypass select signal is also sent to the power gate logic via instruction issue. Since dependent instructions will be started as soon as possible, result forwarding via bypass networks is implemented thus reducing the latency between dependent instructions. If instructions are issued in low frequency without usage of a bypass network, the execution bandwith is low due to the instruction mix. Thus, the power gate control logic will enter the powergate mode. Otherwise the unit will stay active when executing dependent instructions.

Figure 3:
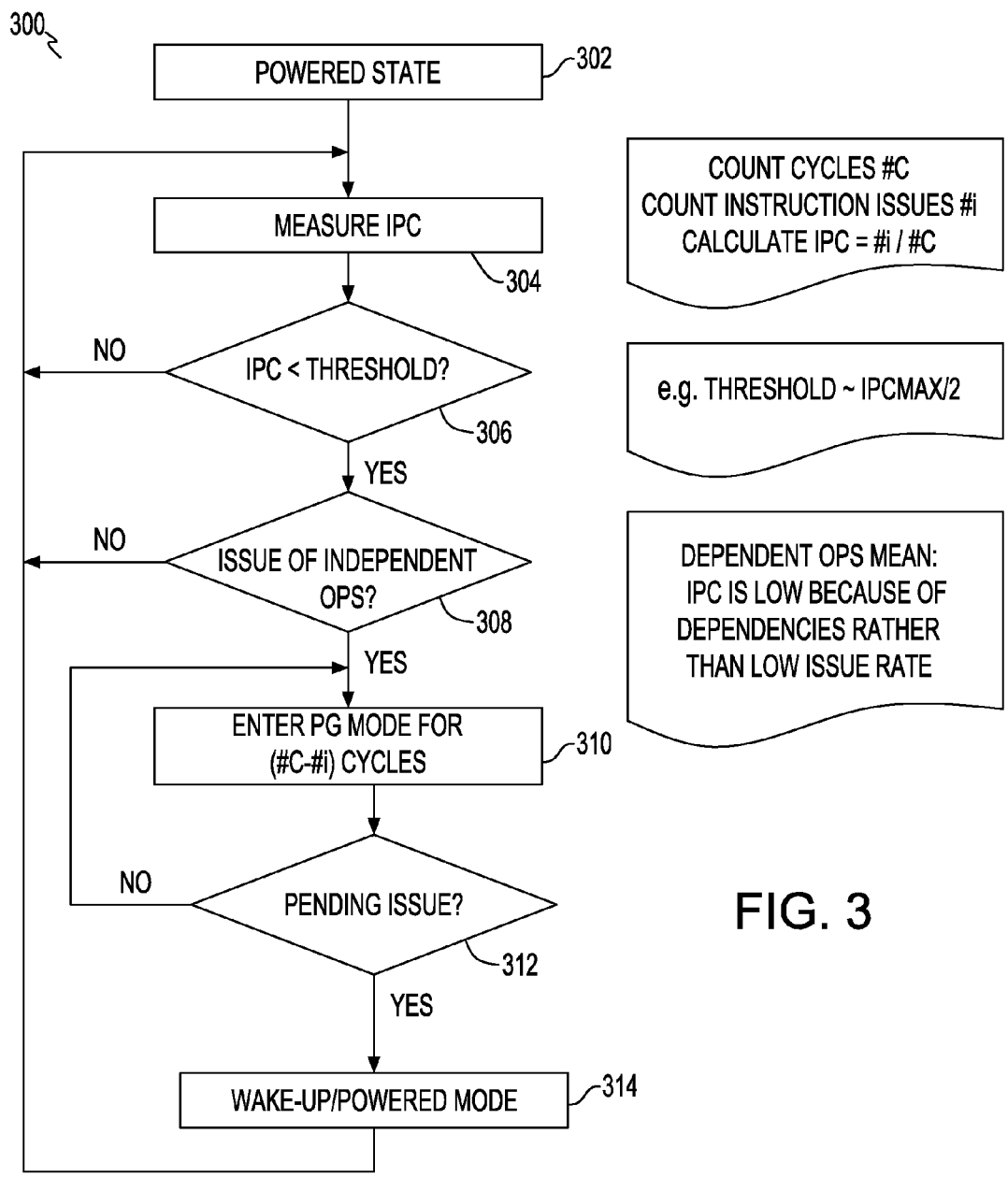
FIG. 3 is a flow chart depicting methodology employed by the state machine implemented in the present invention.

FIG. 3 shows a flow chart 300 depicting method steps to perform the powergating control (as implemented by state machine) 206 in FIG. 2. Initially power is applied (step 302), and while powered, the measurement of Instructions Per Cycle (IPC) is started, (step 304). When the measured value is obtained, it is determined if the value is less than a threshold value, (step 306). If the value is not less than a threshold value (NO; step 306), it is returned to step 302. If the value is less than the threshold level (YES; step 306) the function advances to step 308 where a check is performed to determine if the instructions issued to the unit 202 are independent of each other. This can be checked by observing "bypass signals" which are part of the instruction issue 210. These signals show if an operand is read from the register file or, if it is the result of a previous instruction just completed and can be read directly by passing the register file. The register file is part of the Execution unit 204 and is located in the Functional macros box 213.

If the issued instructions are not independent of each other, (NO; step 308), the function returns to step 304. If they are independent (i.e., bypasses are not used) of each other, (YES; step 308), the workload of the unit in not at its maximum. This means that power gating can be activated without significant loss of performance until the instruction queue in the instruction scheduling unit is filled. The cycle period for this is predicted in step 310 where #I (the number of instruction) is subtracted from #C (the number of cycles).

In the instance where the last instruction executed before entering power gating is the final instruction because the thread terminated or an interrupt handler is currently executed, the unit checks if an instruction is still pending (step 312). If no, (NO; step 312), the function returns to step 310 and power gating stays active for another period of #C-#I cycles. Then, power gating of the unit is deactivated and the next set of instructions is executed. When an instruction is still pending (YES; step 312) the function advances to the Wake-up/powered mode (step 314) and then goes to step 304.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein - is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

As will be appreciate by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module' or "system." Furthermore, the present invention may take the form of a computer program produce embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM) or Flash memory), an optical fiver, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then complied, interpreted, of otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider).

The present invention is described above with reference to flow chart illustrations and/or block diagrams of methods, apparatus (systems) and computer program products according to embodiments of the invention. It will be understood that each block of the flow chart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block of blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A microprocessor having power gate control logic comprising:
   an instruction scheduling unit coupled in handshaking relationship with an execution unit,
   said execution unit comprising a state machine implementing power gate control logic and logic for measuring a number of instructions being issued from the instruction scheduling unit per cycle and functional macros;
   said instruction scheduling unit comprising an instruction queue;
   wherein instructions are selectively sent between said instruction queue in said instruction scheduling unit and the functional macros according to said power gate control logic implemented by state machine in the execution unit, said state machine determining if the number of issued instructions per cycle is less than a threshold value, and determining further if at least two of the instructions being issued from the instruction scheduling unit are independent of each other only when the instructions issued per cycle is less than a threshold level, and issuing power gate mode control signals to remove power to the functional macros dynamically when said instructions are independent of each other without incurring significant loss of performance.

2. The microprocessor as claimed in claim 1, further comprising: a counter device for counting a number of instructions issued from the instruction scheduling unit as a function of a predetermined number of clock cycles.

3. The microprocessor as claimed in claim 1 wherein said execution unit is configured to:
predict a time period for power gating the microprocessor by subtracting the number of instructions from the number of cycles.

4. The microprocessor as claimed in claim 3 wherein said execution unit is configured to:
return to measuring another number of instructions per cycle when the last instruction executed before removing power at the microprocessor is the final instruction and an instruction is still not pending; and
continue removing power at the microprocessor for another period equal to number of cycles minus number of instructions when an instruction is not pending.

5. The microprocessor as claimed in claim 1, wherein said functional macros receives valid instructions issue bypass signals from said instruction scheduler unit indicating instruction dependence, wherein said determining independence of issued instructions includes observing absence of bypass signals for said issued instructions.

6. The microprocessor as claimed in claim 1, wherein said power gate control is effected for a time period equivalent to a quantity of #C-#I cycles, where #C is a number of cycles is taken from a measurement of how long it takes to execute as many instruction as can be stored in the instruction queue and #I is a number of instructions issued.

7. The microprocessor as claimed in claim 1, wherein said instruction queue continues to collect instructions in the instruction queue during the power gate mode.

8. The microprocessor as claimed in claim 1, wherein said state machine asserts a power gate control signal to said Instruction Scheduler Unit to prevent issuance of instructions to said execution unit for an interval of cycles which represent a number of idle cycles counted in a temporal sequence during which the active cycles have been counted to reach said threshold, whereby after this interval of cycles, the power gate control signal is dropped, and the instruction scheduling unit commences issuing the corresponding instructions which have been collected in the instruction queue during the power gate mode.

9. The microprocessor as claimed in claim 8, further comprising: a stall detector for detecting a pipeline stall indicating the instruction queue has reached a full state while said execution unit is unavailable, and asserting an emergency wakeup signal to immediately power on the execution unit to receive issued instructions.

10. The microprocessor as claimed in claim 1, wherein said execution unit is configured to determine, subsequent to measuring the number of instructions per cycle, if the number of instruction per cycle being issued from the instruction scheduling unit is less than a threshold level, and when the instructions per cycle is greater than the threshold level, returning to measuring another number of instructions per cycle.

11. The microprocessor as claimed in claim 1, wherein said execution unit is configured to return to measuring another number of instructions per cycle when the at least two of the instructions being issued from the instruction scheduling unit are not independent of each other.

\* \* \* \* \*